Patented July 2, 1940

2,206,062

UNITED STATES PATENT OFFICE 2,206,062

EMULSION BREAKING REAGENT AND METHOD OF PREPARING THE SAME

James G. Suthard, Chicago, Ill.

No Drawing. Application December 7, 1934,
Serial No. 756,515

3 Claims. (Cl. 252—1)

This invention relates to a method of and reagents for breaking emulsions. More specifically the invention is concerned with a novel method for resolving various types of water-in-oil emulsions and to reagents effective in separating such emulsions into distinct phases so that the oil can be freed from the water.

In many localities, petroleum as pumped from the well is emulsified with water or brine and must be separated from the aqueous phase prior to refining. In addition, to the crude oil emulsions, other oil emulsions known as slop oil or B. S. accumulate around refineries. Slop oil is a conglomeration of refinery wastes such as residuums from cracking stills, residuums from straight run stills, and sludges resulting from chemical refining of various oil fractions. These various products may be run through ditches to sumps where they are collected to be treated and used for cracking stock or fuel oil. The products become emulsified with water on their way to the sumps and the resulting emulsion is usually more difficult to break than crude oil emulsions. In some cases these emulsions are so tight that they will not yield satisfactorily to known demulsifying agents.

Upon examination under an ultra-microscope it is apparent that droplets of water of varying sizes are held in suspension in the oil. Upon treatment of the emulsions with different reagents some appear to agglomerate the droplets within a certain range of size but have little or no effect upon droplets outside of that particular range. Contrary to what would be normally expected, if these emulsions are treated with two different reagents, each of which conglomerates droplets within different size ranges, the droplets, within the ranges susceptible to the reagents used, will not agglomerate. As a matter of fact, in some instances the reagents actually inhibit the action of each other so that the result is less satisfactory than if either one is used alone.

My invention completely obviates the difficulties presented in resolving such emulsions. Not only do the constituents of my reagent not hinder the action of each other in agglomerating water droplets of different sizes but they accelerate or assist the action of each other so that the most refractory emulsions can be broken rapidly in a continuous manner.

One of the objects of my invention is to provide a reagent which will break water-in-oil emulsions regardless of size and nature of the water particles held in suspension.

Another object of my invention is to provide a method of preparing the reagents suitable for breaking various types of emulsions.

A third object of my invention is to provide a new method of completely resolving emulsions into their oil and water components so that the water may be quickly and readily separated from the oil.

Further objects of my invention will appear from the following detailed description.

In accordance with my invention I have discovered that if naphthenic soaps of the alkali or alkaline earth metals are mixed with an aldehyde such as formaldehyde or other aldehydic compound which is capable of readily liberating formaldehyde, and the mixture dissolved in a solvent such as butyl or amyl alcohol, a stable solution is formed which will break the most difficult emulsions.

In preparing a reagent in accordance with my invention I saturate a higher alcohol, such as amyl alcohol, with formaldehyde by passing gaseous formaldehyde through a body of the alcohol. The saturated alcohol is then mixed with a naphthenic acid soap such as sodium naphthenate in various proportions, as for example approximately 20 parts of alcohol solution to 80 parts of soap. After thoroughly mixing, the materials will form a permanent solution. Upon standing over a period of time a small amount of solid material may separate out probably due to the formation of para-formaldehyde. In order to prevent such separation a small amount of inhibitor may be added to the solution at the time it is formed or afterward. Such inhibitors as catechol, benzylamino phenol, or alpha naphthol may be used and should be added in amounts varying from 0.1% to .0001%. Other inhibitors may be used but should preferably be soluble in the alcohol solvent.

The naphthenic acid soaps which form a part of the reagent are prepared by neutralization of the naphthenic acids contained in light or heavy petroleum distillates, or by the neutralization of acid sludge resulting from the treatment of naphthenic acid-containing distillates with sulfuric acid. Either naphthenic or sulfo-naphthenic acids or a mixture thereof may be used in the preparation of my reagent.

Although I have specifically mentioned amyl and butyl alcohols as solvents suitable in preparing the reagent, other higher alcohols which are liquid at ordinary temperatures and which are solvents for the aldehyde and the naphthenic acid soaps, may be used in lieu thereof. However, butyl and amyl alcohols are most satisfactory due to their comparatively low price and high solvent power for both formaldehyde and naphthenic acid soaps. The lower alcohols such as methyl, ethyl, and propyl have been tried but have not been found to be very satisfactory because of their low solvency for naphthenic acid soaps. Polyhydric alcohols such as ethylene glycol and glycerine have also been tried but have been found to be unsuitable because of their low solvent power for soaps of naphthenic and sulfo-naphthenic acids.

The amount of the reagent, prepared as above described, that should be used in breaking emulsions will depend on the particular type of emulsion to be treated. With emulsions which are readily resolved, approximately 1 gallon of reagent per 100 barrels of emulsion may be used and this amount will range up to 10 gallons per 100 barrels for extremely tight emulsions. In the treatment of slop oil which is difficult to resolve into its oil and water components, I have found that from 3 to 5 gallons of reagent per 100 barrels of emulsion gives satisfactory results.

In breaking emulsions in accordance with my invention, the reagent is added to the emulsion and the mixture heated to approximately 150° F. The treatment may be carried out at atmospheric temperatures but requires longer periods of time for separation, whereas when the treatment is carried out at elevated temperatures, demulsification takes place almost immediately. Higher temperatures may be used but in such cases the mixture should be maintained under superatmospheric pressure in order to prevent loss of light ends from the oil. Because of the rapidity with which the emulsion breaks, the process can be carried out as a continuous one. However, it may be operated as a batch process if desired.

Under some conditions, particularly in treatment of slop oil, it is beneficial to give the emulsion a preliminary treatment with caustic soda. For this purpose I have found that 3 gallons of 10% sodium hydroxide solution per 100 barrels of emulsion will put the emulsion in a condition where it can be readily resolved into its components by treatment with the naphthenic soap-aldehyde-alcohol reagent. In place of caustic soda I may use spent doctor or spent caustic solution for the pre-treatment. The demulsifying agent is preferably added to the emulsion while the caustic soda is thoroughly mixed therewith.

In order to determine the effectiveness of my reagent in breaking emulsions, the following tests were performed on slop oil having 24% of bottom settlings and water:

Example 1

5 gallons of naphthenic soaps were added to 100 barrels of the emulsion. Upon examination under a microscope it was found that the water droplets of more than 8 mu diameter coalesce rapidly, while the droplets of 8 mu or smaller coalesce only very slowly so that the emulsion was not completely resolved into the components.

Example 2

5 gallons of a 37% solution of formaldehyde in alcohol were added to 100 barrels of the emulsion at 150° F. The amyl alcohol formaldehyde solution separated in lakes instead of dissolving in the emulsion or mixing therewith. The small droplets of water of 8 mu or less in diameter coalesce rapidly, while the larger droplets of diameters greater than 8 mu were very slowly affected so that the emulsion was not completely broken.

Example 3

The emulsion was treated with a solution of formaldehyde in alcohol in the proportion of 5 gallons of the solution to 100 barrels of emulsion. To the mixture 5 gallons of naphthenic acid soaps were added. The amyl alcohol formaldehyde solution again separated into lakes and the naphthenic acid soaps would not dissolve therein. The addition of the soap appeared to interrupt the coalescence of the smaller droplets of the 8 mu and less in diameter. The effect of adding the two reagents separately appeared to be the interruption of the coalescence of both the large and the small droplets.

Example 4

In accordance with my invention 5 gallons of the solution composed of naphthenic acid soaps and formaldehyde in amyl alcohol were added to the emulsion in the proportion of 5 gallons per 100 barrels. The reagent appeared to be completely miscible with the emulsion and caused the coalescence of both large and small water droplets. Both size particles of water broke more rapidly than when the constituents were added separately as in Examples 1 and 2.

Although I have stated certain proportions of the ingredients in my reagent, it will be understood that the invention is not limited to the specific amounts herein stated but may vary over a wide range. The proportion of amyl alcohol solution to naphthenic acid soaps herein mentioned is a specific example of the preferred amounts of the constituents in the reagent, but it will be apparent that the amyl alcohol-formaldehyde may form the major proportion of the solution or mixture and the naphthenic acid soaps the minor proportion without deviating from spirit or scope of the invention.

It will be further understood that although the specific example discloses the treatment of slop oil, the invention is applicable to all types of petroleum emulsions in which water is present in the dispersed phase.

What I claim is:

1. A demulsifying agent which comprises formaldehyde together with naphthenic and sulfonaphthenic acid soaps of alkali or alkali metals dissolved in an alcohol selected from the group consisting of butyl and amyl alcohols, and an inhibitor capable of prohibiting polymerization of the formaldehyde.

2. The method of preparing a demulsifying agent which comprises dissolving formaldehye in an alcohol taken from the group consisting of butyl and amyl alcohols, dissolving soaps of naphthenic acids in the formaldehyde-alcohol solution, and adding an aldehyde-polymerizing inhibitor to the reagent.

3. A demulsifying agent comprising formaldehyde and alkali or alkali earth metal naphthenic acid soaps dissolved in an alcohol liquid at ordinary temperatures and having at least four carbon atoms, and an aldehyde-polymerizing inhibitor.

JAMES G. SUTHARD.